US011821462B2

(12) United States Patent
Imura

(10) Patent No.: US 11,821,462 B2
(45) Date of Patent: Nov. 21, 2023

(54) SLIDING MEMBER

(71) Applicant: EAGLE INDUSTRY CO., LTD., Tokyo (JP)

(72) Inventor: Tadatsugu Imura, Tokyo (JP)

(73) Assignee: EAGLE INDUSTRY CO., LTD.

( * ) Notice: Subject to any disclaimer, the term of this patent is extended or adjusted under 35 U.S.C. 154(b) by 542 days.

(21) Appl. No.: 17/259,336

(22) PCT Filed: Aug. 22, 2019

(86) PCT No.: PCT/JP2019/032723
§ 371 (c)(1),
(2) Date: Jan. 11, 2021

(87) PCT Pub. No.: WO2020/040234
PCT Pub. Date: Feb. 27, 2020

(65) Prior Publication Data
US 2021/0301865 A1  Sep. 30, 2021

(30) Foreign Application Priority Data

Aug. 24, 2018 (JP) .................................. 2018-157873

(51) Int. Cl.
F16C 17/04 (2006.01)
F16J 15/34 (2006.01)

(52) U.S. Cl.
CPC ............ F16C 17/045 (2013.01); F16J 15/34 (2013.01)

(58) Field of Classification Search
CPC ...... F16C 17/045; F16J 15/34; F16J 15/3408; F16J 15/3412; F16J 15/3416; F16J 15/342; F16J 15/3424; F16J 15/3428
See application file for complete search history.

(56) References Cited

U.S. PATENT DOCUMENTS

| 3,085,808 A | 4/1963 | Williams ....................... 277/388 |
| 3,232,680 A | 2/1966 | Clark ............................. 384/110 |
| 3,410,565 A | 11/1968 | Williams ....................... 277/348 |
| 3,466,052 A | 9/1969 | Ludwig |
| 3,499,653 A | 3/1970 | Gardner .......................... 277/27 |
| 3,527,465 A | 9/1970 | Guinard ........................ 277/400 |

(Continued)

FOREIGN PATENT DOCUMENTS

| CN | 1364987 | 8/2002 | ............... F16J 15/40 |
| CN | 2534429 | 2/2003 | ............... F16J 15/40 |

(Continued)

OTHER PUBLICATIONS

Chinese Office Action issued in application No. 201980087670.2 (with translation), dated Jul. 1, 2022 (17 pgs).

(Continued)

*Primary Examiner* — Phillip A Johnson
(74) *Attorney, Agent, or Firm* — HAYES SOLOWAY P.C.

(57) ABSTRACT

In a pair of sliding members (3, 5) sliding relative to each other on sliding surfaces (S), at least one of the sliding surfaces (S) includes a dynamic pressure generation mechanism (11), and the curvature of the dynamic pressure generation mechanism (11) is set to increase in proportion to the flow path length of the dynamic pressure generation mechanism (11). The sliding member can exhibit a pumping action even at low-speed rotation and can exhibit sealing function and lubrication function.

20 Claims, 3 Drawing Sheets

(56) References Cited

U.S. PATENT DOCUMENTS

| | | | |
|---|---|---|---|
| 3,656,227 A | 4/1972 | Weinand | 29/530 |
| 3,804,424 A | 4/1974 | Gardner | 277/27 |
| 4,406,466 A | 9/1983 | Geary, Jr. | 277/347 |
| 4,486,026 A | 12/1984 | Furumura et al. | 277/80 |
| 5,092,612 A | 3/1992 | Victor | 277/400 |
| 5,201,531 A | 4/1993 | Lai | F16J 15/3412 |
| 5,222,743 A | 6/1993 | Goldswain | 277/400 |
| 5,385,409 A | 1/1995 | Ide | F16J 15/3432 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,496,047 A * | 3/1996 | Goldswain | F16J 15/3412 |
| | | | 277/400 |
| 5,498,007 A | 3/1996 | Kulkarni | 277/366 |
| 5,501,470 A | 3/1996 | Fuse | 277/400 |
| 5,529,318 A | 6/1996 | Fuse | F16J 15/3412 |
| 5,556,111 A | 9/1996 | Sedy | 277/96.1 |
| 5,605,339 A | 2/1997 | Pecht | F16J 15/3412 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,142,478 A * | 11/2000 | Pecht | F16J 15/3484 |
| | | | 277/400 |
| 6,189,896 B1 | 2/2001 | Dickey et al. | F16L 17/06 |
| 6,446,976 B1 | 9/2002 | Key | 277/367 |
| 6,575,470 B1 | 6/2003 | Gacek | F16J 15/3412 |
| 6,817,766 B2 | 11/2004 | Gomyo | F16C 32/06 |
| 7,510,330 B2 | 3/2009 | Obara | F16C 32/06 |
| 7,568,839 B2 | 8/2009 | Gotoh et al. | F16C 32/06 |
| 7,758,051 B2 | 7/2010 | Roberts-Haritonov et al. | |
| | | | F16J 15/34 |
| 9,062,775 B2 | 6/2015 | Short et al. | F16J 15/34 |
| 9,353,865 B2 | 5/2016 | Lattin | F16N 21/00 |
| 9,353,867 B2 | 5/2016 | Itadani | F16J 15/342 |
| 9,371,912 B2 | 6/2016 | Hosoe et al. | F16J 15/34 |
| 9,587,745 B2 | 3/2017 | Itadani et al. | F16J 15/3412 |
| 9,677,670 B2 | 6/2017 | Itadani et al. | F16J 15/34 |
| 9,829,109 B2 | 11/2017 | Itadani et al. | F16J 15/3412 |
| 9,845,886 B2 | 12/2017 | Itadani | F16C 17/045 |
| 9,951,873 B2 | 4/2018 | Inoue et al. | F16J 15/34 |
| 9,982,784 B2 | 5/2018 | Osada et al. | F16J 15/34 |
| 10,054,230 B2 | 8/2018 | Katori | F16J 15/34 |
| 10,072,759 B2 | 9/2018 | Inoue et al. | F16J 15/34 |
| 10,113,648 B2 | 10/2018 | Inoue et al. | F16J 15/342 |
| 10,190,689 B2 | 1/2019 | Yoshida et al. | F16J 15/3412 |
| 10,337,620 B2 | 7/2019 | Tokunaga et al. | F16J 15/342 |
| 10,352,450 B2 | 7/2019 | Yamanaka et al. | F16J 15/3204 |
| 10,408,349 B2 | 9/2019 | Miyazaki | F16J 15/3272 |
| 10,473,220 B2 | 11/2019 | Tokunaga et al. | F16J 15/34 |
| 10,487,944 B2 | 11/2019 | Itadani | F16J 15/3496 |
| 10,487,948 B2 | 11/2019 | Inoue et al. | F16J 15/342 |
| 10,495,228 B2 | 12/2019 | Itadani et al. | F16J 15/34 |
| 10,648,569 B2 | 5/2020 | Itadani | F16K 15/34 |
| 10,655,736 B2 | 5/2020 | Itadani | F16J 15/3416 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2 | 5/2021 | Itadani | F16J 15/3284 |
| 11,125,335 B2 | 9/2021 | Kimura et al. | F16J 15/34 |
| 11,221,071 B2 | 1/2022 | Sasaki | F16C 17/04 |
| 11,525,512 B2 | 12/2022 | Kimura | F16J 15/3412 |
| 11,530,749 B2 | 12/2022 | Kimura | F16J 15/447 |
| 11,603,934 B2 | 3/2023 | Imura | F16J 15/3412 |
| 11,644,100 B2 | 5/2023 | Kimura | F16J 15/324 |
| 2002/0093141 A1 | 7/2002 | Wang | 277/358 |
| 2003/0178781 A1 | 9/2003 | Tejima | |
| 2004/0080112 A1 | 4/2004 | Tejima | 277/306 |
| 2005/0135714 A1* | 6/2005 | Rahman | F16C 17/107 |
| | | | 384/100 |
| 2005/0141789 A1 | 6/2005 | Kita et al. | F16C 32/06 |
| 2005/0212217 A1 | 9/2005 | Tejima | 277/399 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0189294 A1 | 7/2013 | Koelle et al. | F16J 15/34 |
| 2013/0209011 A1 | 8/2013 | Tokunaga | F16C 32/0633 |
| 2014/0203517 A1* | 7/2014 | Ferris | F16J 15/3412 |
| | | | 277/400 |
| 2015/0115537 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 | 8/2015 | Itadani | F16J 15/342 |
| 2015/0240950 A1 | 8/2015 | Takahashi | F16J 15/363 |
| 2015/0260292 A1 | 9/2015 | Inoue et al. | F16J 15/342 |
| 2015/0377297 A1 | 12/2015 | Tokunaga et al. | F16C 33/748 |
| 2015/0377360 A1 | 12/2015 | Itadani | F16J 15/3412 |
| 2016/0033045 A1 | 2/2016 | Itadani et al. | F16J 15/3412 |
| 2016/0097457 A1 | 4/2016 | Sun et al. | F16J 15/34 |
| 2016/0252182 A1 | 9/2016 | Itadani et al. | F16J 15/34 |
| 2017/0009889 A1 | 1/2017 | Seki | F16J 15/3272 |
| 2017/0198814 A1 | 7/2017 | Colombo et al. | |
| 2017/0234431 A1 | 8/2017 | Katori et al. | F16J 15/3412 |
| 2018/0051809 A1 | 2/2018 | Yoshida | F16J 15/3412 |
| 2018/0058584 A1 | 3/2018 | Miyazaki | F16J 15/164 |
| 2018/0073394 A1 | 3/2018 | Tokunaga et al. | F01D 25/183 |
| 2018/0128377 A1 | 5/2018 | Tokunaga et al. | F16J 15/342 |
| 2018/0128378 A1 | 5/2018 | Tokunaga et al. | F16J 15/342 |
| 2019/0178386 A1 | 6/2019 | Arai | F16J 15/3496 |
| 2019/0301522 A1 | 10/2019 | Negishi et al. | F16C 17/026 |
| 2019/0376558 A1 | 12/2019 | Kimura | F16C 33/743 |
| 2021/0080006 A1 | 3/2021 | Sasaki | F16J 15/34 |
| 2021/0116029 A1 | 4/2021 | Kimura | F16J 15/324 |
| 2021/0116030 A1 | 4/2021 | Kimura | F16J 15/3412 |
| 2021/0116032 A1 | 4/2021 | Kimura | F16J 15/188 |
| 2021/0164571 A1 | 6/2021 | Kimura | F16J 15/3412 |
| 2022/0010835 A1 | 1/2022 | Inoue | F16C 17/045 |
| 2022/0099191 A1 | 3/2022 | Suzuki | F16C 33/103 |
| 2022/0275828 A1 | 9/2022 | Inoue | F16J 15/3424 |

FOREIGN PATENT DOCUMENTS

| | | | |
|---|---|---|---|
| CN | 1401924 | 3/2003 | F16J 15/16 |
| CN | 101749431 | 6/2010 | F16J 15/34 |
| CN | 101776152 | 7/2010 | F16J 15/48 |
| CN | 201582390 | 9/2010 | F16J 15/16 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 105683632 | 6/2016 | F04D 29/10 |
| CN | 106439037 | 2/2017 | F16J 15/34 |
| CN | 206017723 | 3/2017 | F16J 15/16 |
| CN | 107166036 | 9/2017 | F16J 15/16 |
| CN | 107532724 | 1/2018 | F16J 15/54 |
| CN | 107676484 | 2/2018 | F16J 15/3232 |
| CN | 108506494 | 9/2018 | F16J 15/34 |
| DE | 36 19 489 | 12/1987 | F16J 15/34 |
| DE | 4407453 | 9/1995 | F16C 17/08 |
| EP | 0637706 | 8/1993 | F16J 15/34 |
| EP | 0896163 | 2/1999 | F16C 33/10 |
| EP | 2520835 | 11/2012 | F16J 15/34 |
| EP | 2626604 | 8/2013 | F16J 15/34 |
| EP | 2977655 | 1/2016 | F16J 15/34 |
| EP | 3091258 | 11/2016 | F16J 15/34 |
| EP | 3299686 | 3/2018 | F16J 15/34 |
| EP | 3514414 | 7/2019 | F16J 15/34 |
| EP | 3922872 | 12/2021 | F16J 15/34 |
| EP | 3926187 | 12/2021 | F16C 17/04 |
| EP | 3926188 | 12/2021 | F16C 17/04 |
| EP | 3943765 | 1/2022 | F16C 17/04 |
| GB | 1509482 | 5/1978 | F16C 33/10 |
| JP | 36-6305 | 5/1961 | |
| JP | S49-33614 | 9/1974 | F16J 15/34 |
| JP | S54-77305 | 6/1979 | B06B 9/10 |
| JP | S55-177549 | 12/1980 | F16J 15/16 |
| JP | S57-146955 | 9/1982 | F16J 15/34 |
| JP | 58-109771 | 6/1983 | F16J 15/34 |
| JP | 58-137667 | 8/1983 | F16J 15/40 |

(56) References Cited

FOREIGN PATENT DOCUMENTS

| | | | |
|---|---|---|---|
| JP | S59-58252 | 4/1984 | ............... F16J 15/34 |
| JP | S60-107461 | 7/1985 | ............. B63H 23/36 |
| JP | 36182177 U | 5/1986 | |
| JP | S62-37572 | 2/1987 | ............... F16J 51/34 |
| JP | S63-033027 | 3/1988 | ............. F16C 33/46 |
| JP | S63-190975 | 8/1988 | ............... F16J 15/34 |
| JP | H01133572 | 9/1989 | ............... F16J 15/34 |
| JP | 2-236067 | 9/1990 | ............... F16J 15/34 |
| JP | H0314371 U | 2/1991 | |
| JP | 3-35372 | 4/1991 | ............... F16J 15/34 |
| JP | 3-41268 | 4/1991 | ............... F16J 15/34 |
| JP | H0341267 U | 4/1991 | |
| JP | H04-73 | 1/1992 | ............... F16J 15/34 |
| JP | H04-145267 | 5/1992 | ............... F16J 15/34 |
| JP | H04-96671 | 8/1992 | ............... F16J 15/34 |
| JP | H05-90048 | 12/1993 | ............... F16J 15/34 |
| JP | H05-322050 | 12/1993 | ............... F16J 15/34 |
| JP | H07-55016 | 3/1995 | ............... F16J 15/34 |
| JP | H08-89489 | 4/1996 | ............... A61B 5/05 |
| JP | H09-503276 | 3/1997 | ............... F16J 15/34 |
| JP | H09-329247 | 12/1997 | ............... F16J 15/34 |
| JP | H10-38093 | 2/1998 | ............... F16J 15/34 |
| JP | H10-281299 | 10/1998 | ............... F16J 15/34 |
| JP | 2000-179543 | 6/2000 | ............. F16C 17/10 |
| JP | 2001-295833 | 10/2001 | ............. F16C 17/04 |
| JP | 2001-317638 | 11/2001 | ............... F16J 15/34 |
| JP | 2003-161322 | 6/2003 | ............. F16C 33/10 |
| JP | 2003-343741 | 12/2003 | ............... F16J 15/34 |
| JP | 2004-003578 | 1/2004 | ............... F16J 15/34 |
| JP | 2005-188651 | 7/2005 | ............... F16J 15/34 |
| JP | 2005-58051 | 12/2005 | ............. F16C 33/74 |
| JP | 2006-9828 | 1/2006 | ............. F16C 17/02 |
| JP | 2006-022834 | 1/2006 | ............... F16J 15/34 |
| JP | 2006-77899 | 3/2006 | ............... F16J 15/34 |
| JP | 2008-144864 | 6/2008 | ............. F16C 33/10 |
| JP | 2009-250378 | 10/2009 | ............... F16J 15/34 |
| JP | 2010-133496 | 6/2010 | ............... F16J 15/34 |
| JP | 2010-216587 | 9/2010 | ............... F16J 15/34 |
| JP | 2011185292 A | 9/2011 | |
| JP | 2012-2295 | 1/2012 | ............... F16J 15/34 |
| JP | 5271858 | 5/2013 | ............... F16J 15/34 |
| JP | 2016-80090 | 5/2016 | ............... F16J 15/34 |
| JP | 2017-141961 | 8/2017 | ............... F16J 15/34 |
| JP | 6444492 | 12/2018 | ............... F16J 15/34 |
| JP | 2019-15401 | 1/2019 | ............... F16J 15/34 |
| WO | WO 95/06832 | 3/1995 | ............... F16J 15/34 |
| WO | WO 2012/046749 | 4/2012 | ............... F16J 15/34 |
| WO | WO 2014/024742 | 2/2014 | ............... F16J 15/34 |
| WO | WO 2014/050920 | 4/2014 | ............... F16J 15/34 |
| WO | WO 2014/103630 | 7/2014 | ............... F16J 15/34 |
| WO | WO 2014/112455 | 7/2014 | ............... F16J 15/34 |
| WO | WO2014103631 | 7/2014 | ............... F16J 15/34 |
| WO | WO 2014/148316 | 9/2014 | ............... F16J 15/34 |
| WO | WO 2014/174725 | 10/2014 | ............... F16J 15/34 |
| WO | 2016009408 A1 | 1/2016 | |
| WO | WO 2016/035860 | 3/2016 | ............... F16J 15/34 |
| WO | WO 2016/167262 | 10/2016 | ............... F16J 15/34 |
| WO | WO 2016/186019 | 11/2016 | ............... F16J 15/34 |
| WO | WO2016203878 | 12/2016 | ............... F16J 15/34 |
| WO | WO 2017/002774 | 1/2017 | ............... F16J 15/34 |
| WO | WO 2018/034197 | 2/2018 | ............... F16J 15/34 |
| WO | WO 2018/105505 | 6/2018 | ............... F16J 15/34 |
| WO | WO2018139231 | 8/2018 | ............... F16J 15/34 |
| WO | WO2018139232 | 8/2018 | ............. F16C 33/10 |

OTHER PUBLICATIONS

Chinese Office Action issued in application No. 201980043720.7 (with translation), dated Jun. 6, 2022 (12 pgs).
Chinese Office Action issued in application No. 202080014381.2 (with translation), dated Aug. 11, 2022 (15 pgs).
Chinese Office Action issued in application No. 202080012994.2 (with translation), dated Aug. 29, 2022 (14 pgs).
European Official Action issued in related European Patent Application Serial No. 19869466.3, dated May 19, 2022, 9 pages.
European Official Action issued in related European Patent Application Serial No. 19876680.0, dated Jun. 3, 2022, 8 pages.
European Official Action issued in related European Patent Application Serial No. 19888532.9, dated Jul. 8, 2022, 7 pages.
European Official Action issued in related European Patent Application Serial No. 19899646.4, dated Aug. 12, 2022, 9 pages.
Korean Office Action issued in application No. 10-2020-7037305 (with translation), dated Jun. 24, 2022 (17 pgs).
Korean Office Action issued in application No. 10-2021-7002193 (with translation), dated Jul. 18, 2022 (13 pgs).
Office Action issued in U.S. Appl. No. 17/257,260, dated Jul. 6, 2022 (12 pgs).
Definition of groove by Merriam Webster.
Chinese Office Action issued in application No. 201380070532.6 (with translation), dated Jan. 28, 2016 (13 pgs).
Chinese Office Action issued in application No. 201380070532.6 (with translation), dated Sep. 20, 2016 (12 pgs).
Second Office Action issued by the State Intellectual Property Office of China, dated Aug. 29, 2016, for Chinese counterpart application No. 201480002574.0, 8 pages.
First Notification of Reason for Refusal issued by the State Intellectual Property Office of China, dated Dec. 24, 2015, with a search report for Chinese counterpart application No. 201480002574.0, 11 pages.
Office Action issued in U.S. Appl. No. 14/431,733, dated Apr. 29, 2016 (22 pgs).
Office Action issued in U.S. Appl. No. 14/431,733, dated Aug. 18, 2017 (13 pgs).
Office Action issued in U.S. Appl. No. 14/431,733, dated Mar. 31, 2017 (14 pgs).
Office Action issued in U.S. Appl. No. 14/431,733, dated Oct. 6, 2016 (12 pgs).
Office Action issued in U.S. Appl. No. 15/419,989, dated Jan. 26, 2018 (20 pgs).
Office Action issued in U.S. Appl. No. 15/419,970, dated May 11, 2018 (17 pgs).
Office Action issued in U.S. Appl. No. 15/419,970, dated Jan. 23, 2018 (21 pgs).
Office Action issued in U.S. Appl. No. 15/842,862, dated Jun. 5, 2019 (37 pgs).
Office Action issued in U.S. Appl. No. 15/842,855, dated Mar. 12, 2020 (11 pgs).
Office Action issued in U.S. Appl. No. 15/842,855, dated Jun. 29, 2020, 16 pages.
Office Action issued in U.S. Appl. No. 15/842,858, dated Mar. 31, 2020 (10 pgs).
Office Action issued in U.S. Appl. No. 15/842,859, dated Apr. 8, 2020 (12 pgs).
Notice of Allowance issued in U.S. Appl. No. 15/419,970, dated Aug. 9, 2018 (16 pgs).
Notice of Allowance issued in U.S. Appl. No. 14/431,733, dated Feb. 23, 2018 (22 pgs).
Notice of Allowance issued in U.S. Appl. No. 15/419,989, dated Jul. 23, 2018 (11 pgs).
Notice of Allowance issued in U.S. Appl. No. 15/842,862, dated Sep. 30, 2019, 15 pages.
Japanese Office Action (w/translation) issued in application 2018-159877, dated Jun. 13, 2019 (7 pgs).
International Search Report issued in application No. PCT/JP2013/084029, dated Mar. 25, 2014 (4 pgs).
International Preliminary Report on Patentability issued in application No. PCT/JP2013/084029, dated Nov. 5, 2015 (8 pgs).
International Search Report and Written Opinion issued in PCT/JP2014/050402, dated Feb. 10, 2014, with English translation, 12 pages.
International Preliminary Report on Patentability issued in PCT/JP2014/050402, dated Jul. 21, 2015, 4 pages.
International Search Report and Written Opinion issued in PCT/JP2019/045728, dated Dec. 17, 2019, with English translation, 13 pages.

(56) References Cited

OTHER PUBLICATIONS

International Preliminary Report on Patentability issued in PCT/JP2019/045728, dated May 25, 2021, 7 pages.
International Search Report and Written Opinion issued in PCT/JP2019/047890, dated Feb. 10, 2020, with English translation, 13 pages.
International Preliminary Report on Patentability issued in PCT/JP2019/047890, dated Aug. 10, 2021, 7 pages.
International Search Report and Written Opinion issued in PCT/JP2019/049870, dated Mar. 10, 2020, with English translation, 13 pages.
International Preliminary Report on Patentability issued in PCT/JP2019/049870, dated Jun. 16, 2021, 7 pages.
International Search Report and Written Opinion issued in PCT/JP2020/005260, dated Apr. 7, 2020, with English translation, 16 pages.
International Preliminary Report on Patentability issued in PCT/JP2020/005260, dated Aug. 10, 2021, 9 pages.
International Search Report and Written Opinion issued in PCT/JP2020/006421, dated Apr. 21, 2020, with English translation, 13 pages.
International Preliminary Report on Patentability issued in PCT/JP2020/006421, dated Aug. 10, 2021, 6 pages.
International Search Report and Written Opinion issued in PCT/JP2020/017170, dated Jun. 2, 2020, with English translation, 13 pages.
International Preliminary Report on Patentability issued in PCT/JP2020/027005, dated Feb. 1, 2022, 4 pages.
International Search Report and Written Opinion issued in PCT/JP2020/027005, dated Sep. 1, 2020, with English translation, 11 pages.
International Preliminary Report on Patentability issued in PCT/JP2019/032723, dated Mar. 2, 2021, 6 pages.
International Search Report and Written Opinion issued in PCT/JP2019/032723, dated Nov. 5, 2019, with English translation, 17 pages.
International Preliminary Report on Patentability issued in PCT/JP2019/029771, dated Feb. 2, 2021, 7 pages.
International Search Report and Written Opinion issued in PCT/JP2019/029771, dated Sep. 17, 2019, with English translation, 20 pages.
International Preliminary Report on Patentability issued in PCT/JP2019/040209, dated Apr. 27, 2021, 6 pages.
International Search Report and Written Opinion issued in PCT/JP2019/040209, dated Dec. 24, 2019, with English translation, 17 pages.
International Preliminary Report on Patentability issued in PCT/JP2019/038155, dated Mar. 23, 2021, 6 pages.
International Search Report and Written Opinion issued in PCT/JP2019/038155, dated Nov. 19, 2019, with English translation, 18 pages.
Chinese Office Action issued in application No. 201980076998.4 (with translation), dated Jan. 18, 2023, 12 pages.
Chinese Office Action issued in application No. 201980059152.X (with translation), dated Oct. 10, 2022, 14 pages.
Chinese Office Action issued in application No. 202080012994.2(with translation), dated Feb. 2, 2023, 13 pages.
Chinese Office Action issued in application No. 202080012994.2(with translation), dated Apr. 24, 2023, 12 pages.
Chinese Office Action issued in application No. 201980082245.4 (with translation), dated Feb. 16, 2023, 23 pages.
European Official Action issued in application No. 19869466.3, dated Mar. 16, 2023, 7 pages.
European Official Action issued in application No. 22212136.0, dated Mar. 15, 2023, 8 pages.
European Official Action issued in application No. 19850900.2, dated Mar. 28, 2023, 4 pages.
European Official Action issued in application No. 23155551.7, dated Feb. 28, 2023, 7 pages.
European Official Action issued in application No. 19888532.9, dated Mar. 7, 2023, 3 pages.
European Official Action issued in application No. 23158438.4, dated May 15, 2023, 11 pages.
Japanese Decision of Refusal issued in application No. 2021-502065, dated May 23, 2023, 8 pages.
Korean Official Action issued in Korean Patent Application Serial No. 10-2021-7002193, dated Jan. 11, 2023, 11 pages.
Korean Official Action issued in Korean Patent Application Serial No. 10-2021-7022185, dated Apr. 6, 2023, 12 pages.
Korean Official Action issued in Korean Patent Application Serial No. 10-2021-7016898, dated Feb. 16, 2023, 13 pages.
Official Action issued in related U.S. Appl. No. 17/413,466, dated Apr. 12, 2023, 11 pages.
Official Action issued in related U.S. Appl. No. 17/296,466, dated Apr. 12, 2023, 9 pages.
Official Action issued in related U.S. Appl. No. 17/428,909, dated Apr. 21, 2023, 8 pages.
Official Action issued in related U.S. Appl. No. 17/628,158, dated May 15, 2023, 14 pages.
European Official Action issued in related European Patent Application Serial No. 19850900.2, dated Mar. 31, 2022, 11 pages.
European Official Action issued in related European Patent Application Serial No. 19843273.4, dated Mar. 24, 2022, 9 pages.
Chinese Office Action issued in application No. 201980047011.6 (with translation), dated Jul. 7, 2022 (11 pgs).
International Search Report (ISR) dated Nov. 5, 2019, issued for International application No. PCT/JP2019/032723. (2 pages).
Chinese Office Action issued in application No. 201980059152.X (with translation), dated May 8, 2023, 11 pages.
European Search Report issued in application No. 20847261.3, dated Jul. 17, 2023, 8 pages.
Korean Official Action issued in Korean Patent Application Serial No. 10-2021-7028879, dated Jun. 28, 2023, 10 pages.
Official Action issued in related U.S. Appl. No. 17/428,909, dated Jul. 25, 2023, 8 pages.
Notice of Allowance issued in related U.S. Appl. No. 17/296,466, dated Jul. 24, 2023, 9 pages.
U.S. Appl. No. 17/257,260, filed Dec. 30, 2020, Okada.
U.S. Appl. No. 17/275,505, filed Mar. 11, 2021, Tokunaga et al.
U.S. Appl. No. 17/277,282, filed Mar. 17, 2021, Tokunaga.
U.S. Appl. No. 17/296,466, filed May 24, 2021, Inoue et al.
U.S. Appl. No. 17/413,466, filed Jun. 11, 2021, Imura et al.
U.S. Appl. No. 17/420,660, filed Jul. 2, 2021, Suzuki et al.
U.S. Appl. No. 17/428,909, filed Aug. 5, 2021, Tokunaga et al.
U.S. Appl. No. 17/429,896, filed Aug. 10, 2021, Suzuki et al.
U.S. Appl. No. 17/628,158, filed Jan. 18, 2022, Inoue et al.
Chinese Office Action issued in application No. 201980065303.2 (with translation), dated Oct. 10, 2022 (13 pgs).
European Official Action issued in related European Patent Application Serial No. 19914452.8, dated Oct. 5, 2022, 10 pages.
European Official Action issued in related European Patent Application Serial No. 20756664.7, dated Oct. 14, 2022, 8 pages.
European Official Action issued in related European Patent Application Serial No. 20759684.2, dated Oct. 17, 2022, 7 pages.
Korean Office Action issued in application No. 10-2021-7019130 (with translation), dated Oct. 22, 2022 (13 pgs).
Korean Office Action issued in application No. 10-2021-7007194 (with translation), dated Nov. 7, 2022 (14 pgs).
Korean Office Action issued in application No. 10-2021-7009776 (with translation), dated Dec. 12, 2022 (19 pgs).
Notice of Allowance issued in U.S. Appl. No. 17/257,260, dated Nov. 23, 2022, 9 pages.

* cited by examiner

SLIDING MEMBER

CROSS-REFERENCE TO RELATED APPLICATIONS

This application is the U.S. National Phase under 35 U.S.C. § 371 of International Application PCT/JP2019/032723, filed Aug. 22, 2019, which claims priority to Japanese Patent Application No. JP2018-157873, filed Aug. 24, 2018. The International Application was published under PCT Article 21(2) in a language other than English.

TECHNICAL FIELD

The present invention relates to a sliding member suitable for, for example, mechanical seals, bearings, and other slide parts. In particular, the present invention relates to a sliding member such as a sealing ring or a bearing required to reduce friction on sliding surfaces and to prevent leakage of the fluid from the sliding surfaces.

BACKGROUND ART

In a mechanical seal which is an example of a sliding member, in order to maintain sealing performance in the long term, there is a technique for balancing conflicting conditions of "sealing" and "lubrication". For example, in a pair of sliding members that slide relative to each other, those in which a spiral groove is provided on a sliding surface of a sliding component, and using a pumping action of the spiral groove, a sealed fluid that is likely to leak to a low-pressure fluid side is pushed back to the sealed fluid side, thereby improving sealing function of the sliding surface are known (for example, see Patent Document 1).

CITATION LIST

Patent Document

Patent Document 1: JP 61-82177 U

SUMMARY OF THE INVENTION

Problem to be Solved by the Invention

However, in the above technique, the pumping action of the spiral groove is exhibited only at above a certain rotating speed, and therefore a low-speed rotating equipment could not obtain sufficient sealing effect even if the spiral groove is provided on the sliding surface.

The present invention has an object to provide a sliding member that can exhibit a pumping action even at low-speed rotation and can exhibit sealing function and lubrication function.

Means for Solving Problem

To solve the above problem, a sliding member according to a first embodiment of the present invention is a pair of sliding members that slide relative to each other on sliding surfaces, and is characterized in that:

at least one of the sliding surfaces includes a dynamic pressure generation mechanism, and the curvature of the dynamic pressure generation mechanism increases according to the flow path length from an inlet opening of the dynamic pressure generation mechanism.

According to the first aspect, the shape of the dynamic pressure generation mechanism is such that the curvature is small at the inlet opening of the dynamic pressure generation mechanism (the curvature radius is large) and the curvature is increased in proportion to the flow path length from the inlet opening of the dynamic pressure generation mechanism (the curvature radius is small). Thereby, the difference between the angle at which the fluid flows into the dynamic pressure generation mechanism and the angle of the inlet opening of the dynamic pressure generation mechanism can be reduced. Moreover, as the fluid within the dynamic pressure generation mechanism flows to the flow path downstream side, the rotational velocity of the fluid is efficiently converted into the radial velocity. Thereby, it is possible to reduce a loss in inflow when the fluid flows into the inlet opening of the dynamic pressure generation mechanism, and it is possible to generate a pumping action even at low-speed rotation.

The sliding member according to a second aspect of the present invention is characterized in that the angle between an inner circumferential edge of the sliding surface and the inlet opening of the dynamic pressure generation mechanism is set to from 0° to 45°.

According to the second aspect, an angle $\theta_1$ between an inner circumferential edge 5b of the sliding surface S and the inlet opening of the dynamic pressure generation mechanism is $0° \leq \theta_1 \leq$ to 45°, thereby it is possible to extremely reduce a loss in inflow when the fluid flows into the dynamic pressure generation mechanism.

The sliding member according to a third aspect of the present invention is characterized in that the shape of the flow path is represented by the following formulas:

$$P = P_0 + h \int_0^S e^{j\phi} dS \qquad \text{(Formula 1)}$$

$$\phi = \phi_0 + \phi_v S + \phi_u S^2 \qquad \text{(Formula 2)}$$

$$S = \frac{s}{h} \ (0 < S < 1), \qquad \text{(Formula 3)}$$

where P is a position vector of a point on the dynamic pressure generation mechanism, $P_0$ is a position vector of the inlet opening of the dynamic pressure generation mechanism, s is a flow path length from $P_0$ to P, h is an entire length of the flow path of the dynamic pressure generation mechanism, S is what s is normalized by h, $\phi$ is a tangential angle at P, $i=\sqrt{-1}$ is an imaginary unit, $\phi_0$ is a tangential angle at $P_0$, $\phi_v$ is an increment of the tangential angle to $\phi_0$ in h in a circular arc of the length h having $\phi_0$, and $\phi_u$ is an increment of the tangential angle to $\phi_v$ in h.

According to the third aspect, easily by means of the above formulas, it is possible to reduce a loss in inflow when the fluid flows into the inlet opening of the dynamic pressure generation mechanism, and it is possible to generate a pumping action even at low-speed rotation.

The sliding member according to a fourth aspect of the present invention is characterized in that the flow path is such that one end communicates with a leakage side and the other end is surrounded by a land portion.

According to the fourth aspect, since the dynamic pressure generation mechanism exhibits a pumping action even at low-speed, even when dynamic pressure by the dynamic pressure generation mechanism is not sufficiently generated at low-speed, the fluid flowed into the dynamic pressure generation mechanism can generate positive pressure by a wedge effect, and therefore it is possible to maintain the sliding surface at a fluid lubrication state even at low-speed rotation.

The sliding member according to a fifth aspect of the present invention is characterized in that the flow path is made of a groove portion.

According to the fifth aspect, the dynamic pressure generation mechanism can be easily constituted from the groove portion.

The sliding member according to a sixth aspect of the present invention is characterized in that the flow path is a pseudo flow path made of a dimple group consisting of a plurality of dimples.

According to the sixth aspect, the dynamic pressure generation mechanism can be easily constituted from the dimple group.

DESCRIPTION OF EMBODIMENTS

Hereinafter with reference to the drawings, modes for carrying out the present invention will be described illustratively based on an embodiment. However, the dimensions, materials, shapes, relative arrangements, and others of components described in the embodiment are not intended to limit the scope of the present invention only to them unless otherwise described explicitly.

Referring to FIG. 1 to FIG. 3A, as to a sliding member according to the present invention, a mechanical seal which is an example of the sliding member will be described. In a first embodiment, the outer circumferential side of the sliding member constituting the mechanical seal is described as a sealed fluid side and the inner circumferential side is described as a leakage side.

Figure 1:
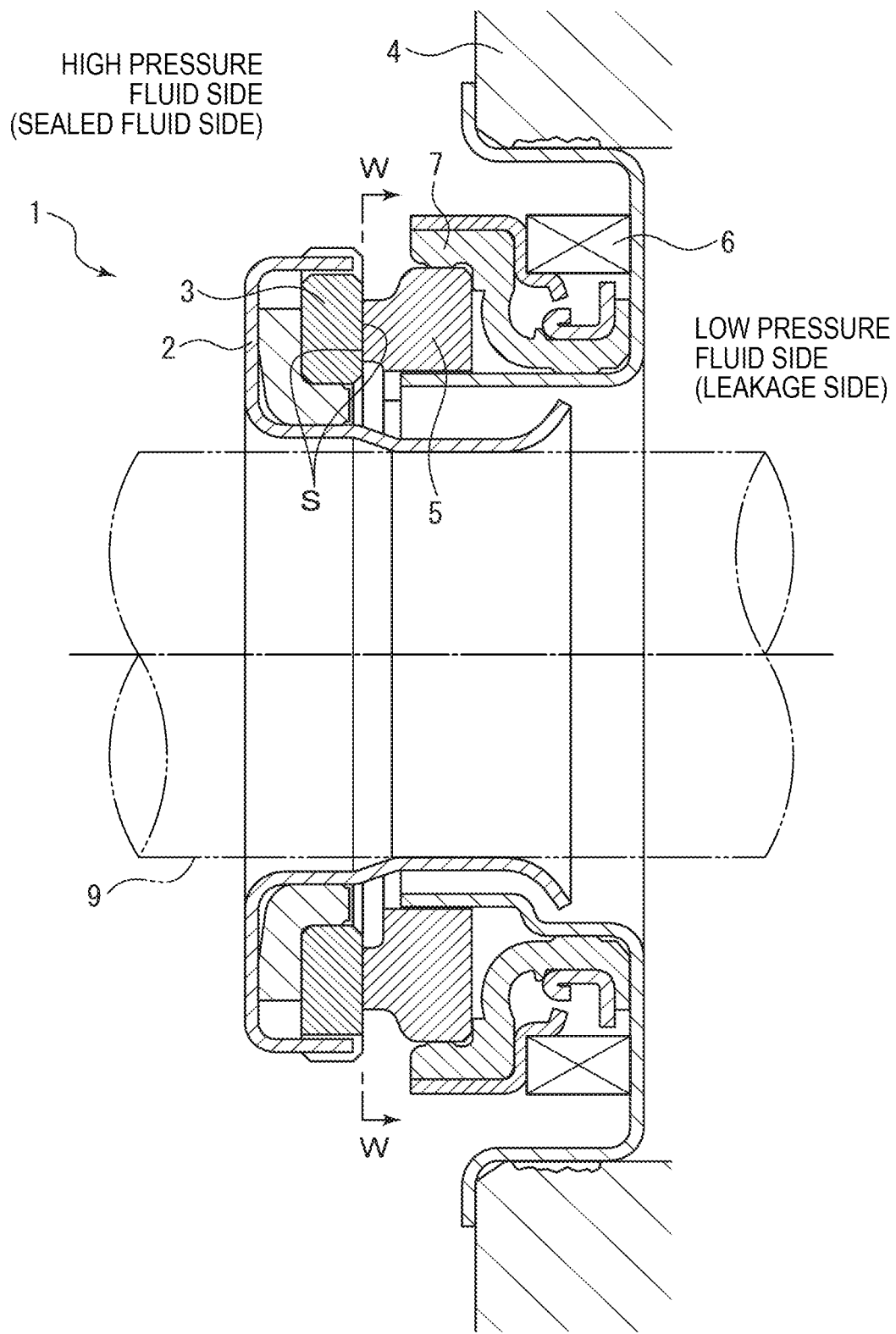
FIG. 1 is a vertical cross-sectional view showing an example of a mechanical seal including a sliding member according to the present invention.

A mechanical seal 1 in FIG. 1 includes a rotating-side sealing ring 3 integrally rotatable with a sleeve 2 mounted on a rotating shaft 9 side, a circular-ring shaped stationary-side sealing ring 5 which is the other slide component provided in a state of being axially movable to a casing 4 and non-rotatable, a coiled wave spring 6 axially biasing the stationary-side sealing ring 5, and a bellows 7 which seals the stationary-side sealing ring 5, and mirror-finished sliding surfaces S slide in close contact with each other.

In the mechanical seal 1, the rotating-side sealing ring 3 and the stationary-side sealing ring 5 have the sliding surfaces S formed radially, and the mechanical seal 1 prevents a sealed fluid from flowing out from the outer circumferential side of the sliding surface S to the leakage side on the inner circumferential side at each other's sliding surfaces S.

In addition, in FIG. 1, a case where the width of the sliding surface of the rotating-side sealing ring 3 is wider than the width of the sliding surface of the stationary-side sealing ring 5 is shown, but the present invention is not limited thereto, and of course can be applied to the opposite case.

Although the materials of the rotating-side sealing ring 3 and the stationary-side sealing ring 5 are selected from silicon carbide (SiC) excellent in wear resistance, carbon excellent in self-lubricity and the like, for example, both may be SiC or combinations of SiC as the rotating-side sealing ring 3 and carbon as the stationary-side sealing ring 5 are possible.

Figure 2:
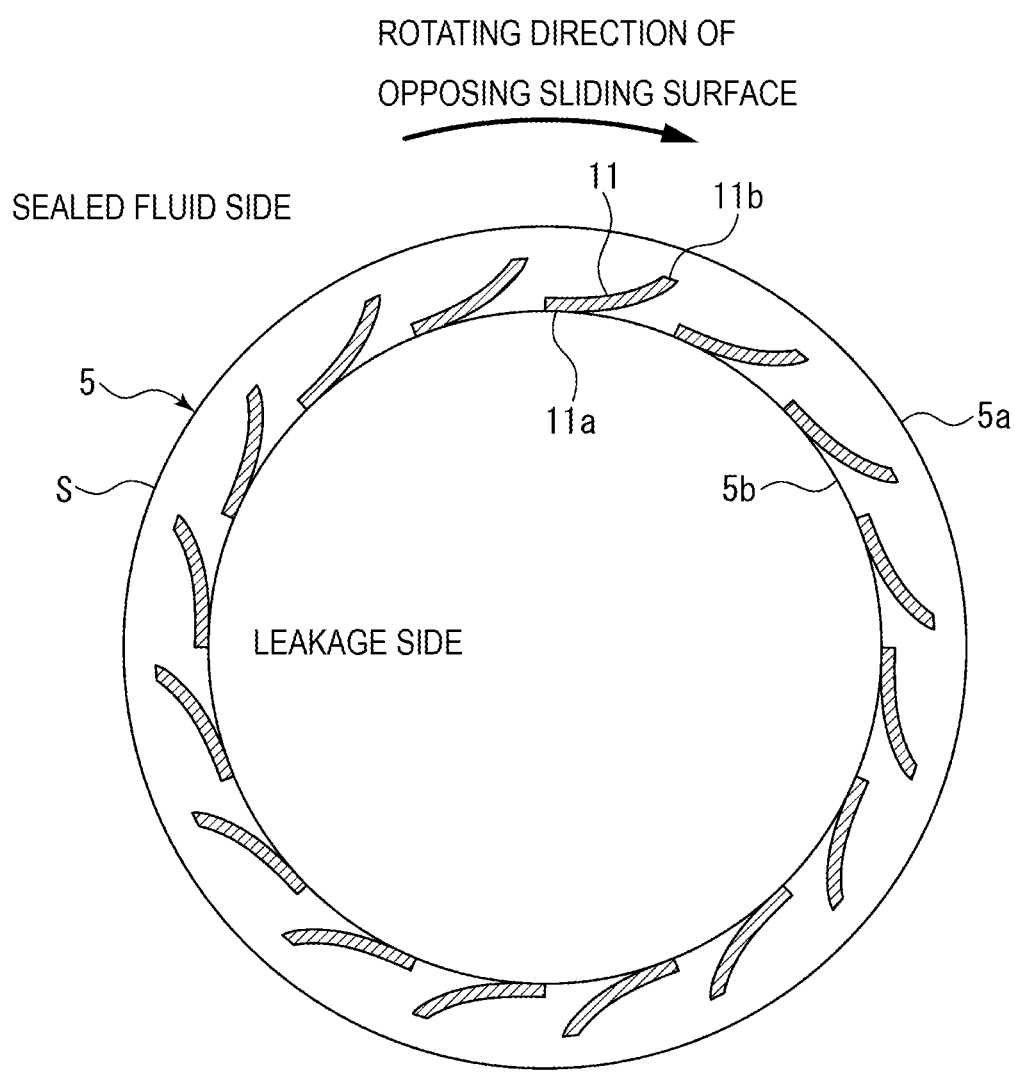
FIG. 2 is a drawing showing a sliding surface of the sliding member taken along the arrow W-W in FIG. 1.

As shown in FIG. 2, on the sliding surface S of the stationary-side sealing ring 5, a predetermined number (eighteen in the embodiment of FIG. 2) of dynamic pressure generation mechanisms 11 are arranged. The dynamic pressure generation mechanism 11 is an arcuate groove portion which is convexed toward the leakage side of the sliding surface S, communicates with the leakage side via an inlet opening 11a opened to a circumferential edge 5b on the leakage side, and has a toe part 11b surrounded by a land portion at the sealed fluid side and thus is isolated from the sealed fluid side.

The dynamic pressure generation mechanism 11 has a shape in which the curvature of the dynamic pressure generation mechanism 11 continuously increases toward the toe part 11b (the downstream side) from the inlet opening 11a (the upstream side). The shape of a center line of the dynamic pressure generation mechanism 11 expressed in polar coordinate system is represented by the following Formula (1) to Formula (3):

$$P = P_0 + h \int_0^S e^{i\phi} dS \quad \text{(Formula 1)}$$

$$\phi = \phi_0 + \phi_v S + \phi_u S^2 \quad \text{(Formula 2)}$$

$$S = \frac{s}{h} \; (0 < S < 1), \quad \text{(Formula 3)}$$

where $P_0$ is a position vector of a starting point (the inlet opening 11a of the dynamic pressure generation mechanism 11), P is a position vector of a point on the dynamic pressure generation mechanism 11, s is a length (m) of a curved line from $P_0$ to P, h is an entire length (m) of a flow path of the dynamic pressure generation mechanism 11, S is what s is normalized by the entire length h of the flow path, $\phi$ is a tangential angle (rad) at P of the dynamic pressure generation mechanism 11, $i=\sqrt{-1}$ is an imaginary unit, $\phi_0$ is an initial direction (a tangential angle (rad) of the dynamic pressure generation mechanism 11 at $P_0$), $\phi_v$ is an increment (rad) of the tangential angle to $\phi_0$ in h in a circular arc of the length h having the initial direction $\phi_0$, and $\phi_u$ is an increment (rad) of the tangential angle to $\phi_v$ in h of the dynamic pressure generation mechanism 11. That is, the tangential angle $\phi = \phi_0 + \phi_v + \phi_u$ in h (S=1).

For example, the dynamic pressure generation mechanism 11 is defined by the above four parameters h, $\phi_0$, $\phi_v$, and $\phi_u$. In addition, when both $\phi_0$ and $\phi_v$ are zero, the dynamic pressure generation mechanism 11 coincides with an equiangular spiral. When $\phi_v$ and $\phi_u$ are positive values, the dynamic pressure generation mechanism 11 forms a curved line convexed toward the leakage side of the sliding surface S. In order to define the shape of the dynamic pressure generation mechanism 11 according to the present invention, $\phi_v$ and $\phi_u$ are set within the ranges of $0 \leq \phi_v \leq 2$ and $0 \leq \phi_u \leq 1$.

Figure 3A:
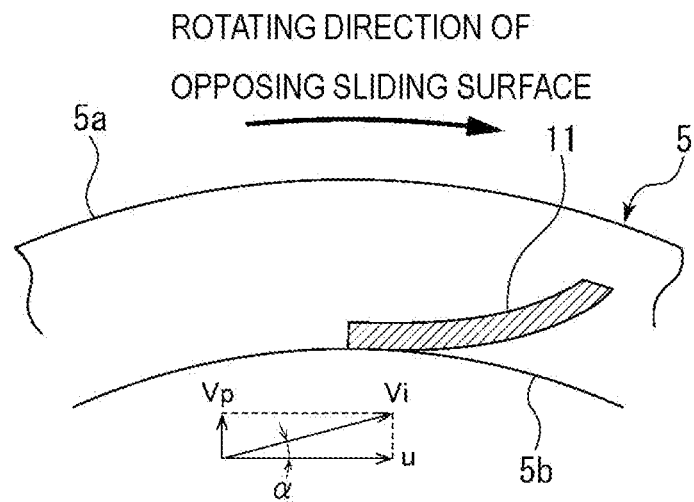
FIGS. 3A and 3B are drawings for explaining a difference between a dynamic pressure generation mechanism according to the present invention (FIG. 3A) and a conventional spiral-shaped dynamic pressure generation mechanism (FIG. 3B).

Moreover, when $\phi_v$ and $\phi_u$ are negative values, the dynamic pressure generation mechanism 11 forms a curved line concaved toward the leakage side of the sliding surface S. In FIG. 3A, by means of Formula (1) to Formula (3), the shape of the dynamic pressure generation mechanism 11 is defined using the vector when $\phi_0$ is zero. That is, the shape of the dynamic pressure generation mechanism 11 is set in such a manner that the curvature is small at the inlet opening 11a of the dynamic pressure generation mechanism 11 (the curvature radius is large) and the curvature is increased according to the flow path length from the inlet opening 11a of the dynamic pressure generation mechanism 11 (the curvature radius is small).

As shown in FIG. 3A, when the sliding member (the rotating-side sealing ring 3) on the opposite side rotates in a predetermined direction (a clockwise direction in FIG. 3A), the fluid, due to its viscosity, moves by following the moving direction of the rotating-side sealing ring 3 and flows into the dynamic pressure generation mechanism 11. For example, as shown in FIG. 3A, when the flow of the fluid from the stationary-side sealing ring 5 is observed, a velocity Vi of the fluid flowing into the dynamic pressure generation mechanism 11 is obtained by combining a circumferential velocity u according to the rotational velocity of the rotating-side sealing ring 3 with a radial velocity Vp by a pumping action of the dynamic pressure generation mechanism 11.

In FIG. 3A, the effect of the circumferential velocity u is large and the radial velocity is low, and therefore an angle α at which the fluid flows into the dynamic pressure generation mechanism 11 is very small. On the other hand, the initial curvature at the inlet opening 11a of the dynamic pressure generation mechanism 11 is set to zero, and therefore the angle between the inner circumferential edge 5b of the sliding surface S and a surface on the convex side of the dynamic pressure generation mechanism 11, that is, an inlet angle of the inlet opening 11a of the dynamic pressure generation mechanism 11 also is zero. Thereby, the difference between the angle α at which the fluid flows into the dynamic pressure generation mechanism 11 and the angle of the inlet opening 11a of the dynamic pressure generation mechanism 11 is very small, and therefore it is possible to reduce a loss in inflow when the fluid flows into the inlet opening 11a of the dynamic pressure generation mechanism 11. Moreover, the circumferential velocity u of the fluid within the dynamic pressure generation mechanism 11 is efficiently converted into the radial velocity Vp toward the flow path downstream side, and therefore it is possible to generate a pumping action for sucking the fluid into the sliding surface S from the leakage side even at low-speed rotation.

Figure 3B:
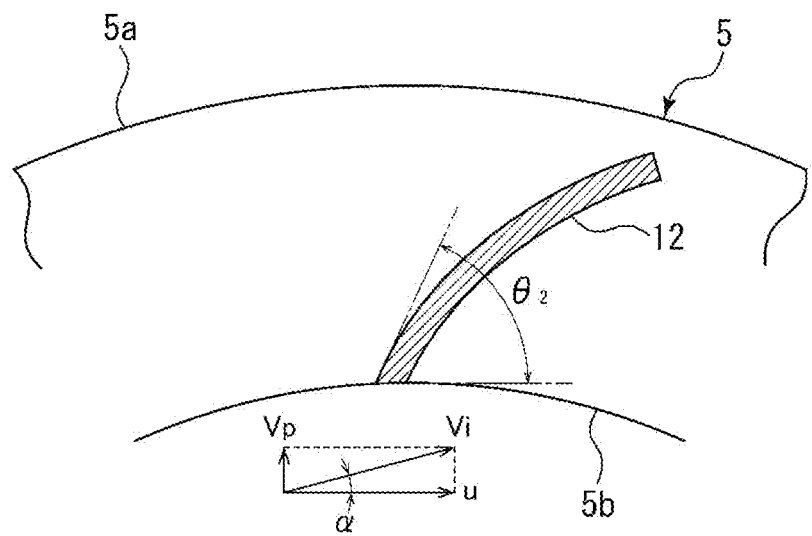

On the other hand, FIG. 3B shows a state that the fluid flows into a conventional spiral-shaped dynamic pressure generation mechanism 12. In a case of the spiral-shaped dynamic pressure generation 12, the difference between the angle α at which the fluid flows into the dynamic pressure generation mechanism 12 and an angle $\theta_2$ of the inlet opening 11a of the dynamic pressure generation mechanism 12 is very large, and therefore a loss in inflow when the fluid flows into the dynamic pressure generation mechanism 12 is very large. Therefore, a pumping action for sucking the fluid into the sliding surface S from the leakage side is not generated till at high-speed rotation.

Thus, the sliding member having the dynamic pressure generation mechanism 11 according to the present invention can exhibit a pumping action even at low-speed rotation (around 10 rpm) and suck the fluid from the leakage side when the rotating-side sealing ring 3 begins to rotate, and can push back, to the sealed fluid side, the sealed fluid that is likely to leak to the low-pressure fluid side, and therefore it is possible to improve sealing performance. Specifically, the angle $\theta_1$ between the inner circumferential edge 5b of the sliding surface S and the inlet opening 11a of the dynamic pressure generation mechanism 11 is $0° \leq \theta_1 \leq 45°$, preferably $0° \leq \theta_1 \leq 10°$, and therefore it is possible to extremely reduce a loss in inflow when the fluid flows into the dynamic pressure generation mechanism 11. Here, $\theta_1$ corresponds to $\phi_0$ in Formula 2.

Moreover, since the dynamic pressure generation mechanism 11 exhibits a pumping action even at low-speed, even when dynamic pressure by the dynamic pressure generation mechanism 11 is not sufficiently generated at low-speed, positive pressure can be generated by a wedge effect at the toe part 11b of the dynamic pressure generation mechanism 11, and therefore it is possible to maintain the sliding surface S at a fluid lubrication state even at low-speed rotation.

As described above, the sliding member according to the present invention exhibits the following effects.

1. Since the shape of the dynamic pressure generation mechanism 11 is set such that the curvature thereof is increased in proportion to the flow path length of the dynamic pressure generation mechanism 11 from the inlet opening 11a, the difference between the angle α at which the fluid flows into the dynamic pressure generation mechanism 11 and the inlet angle of the inlet opening 11a of the dynamic pressure generation mechanism 11 can be set extremely small, and therefore it is possible to extremely reduce a loss in inflow when the fluid flows into the dynamic pressure generation mechanism 11. Moreover, the circumferential velocity u of the fluid within the dynamic pressure generation mechanism 11 is efficiently converted into the radial velocity Vp toward the flow path downstream side, and therefore it is possible to generate a pumping action for sucking the fluid into the sliding surface S from the leakage side even at low-speed rotation.

2. The dynamic pressure generation mechanism 11 is set to have the shape in Formulas (1) to (3), thereby capable of easily designing the dynamic pressure generation mechanism 11 with low loss.

3. Since the dynamic pressure generation mechanism 11 exhibits a pumping action even at low-speed, even when dynamic pressure by the dynamic pressure generation mechanism 11 is not sufficiently generated at low-speed, positive pressure can be generated by a wedge effect at the toe part 11b of the dynamic pressure generation mechanism 11, and therefore it is possible to maintain the sliding surface S at a fluid lubrication state even at low-speed rotation.

Hereinbefore, although the embodiment of the present invention has been described by the drawings, its specific configuration is not limited to the embodiment, and any changes and additions made without departing from the scope of the present invention are included in the present invention.

In the above embodiment, the dynamic pressure generation mechanism 11 is made up of the groove portion, but the present invention is not limited thereto. For example, the dynamic pressure generation mechanism may be made up of a pseudo flow path in which minute dimples are arranged adjacent to each other.

Although the outer circumferential side is described as the sealed fluid side and the inner circumferential side is described as the leakage side, the present invention is not limited thereto, and is also applicable to a case where the inner circumferential side is the sealed fluid side and the outer circumferential side is the leakage side. For example, the inlet opening 11a of the dynamic pressure generation mechanism 11 is assumed as the outer circumferential edge of the sliding surface, and ϕv and ϕu are set within the ranges of $-2 \leq \phi_v \leq 0$ and $-1 \leq \phi_u \leq 0$, thereby capable of defining the dynamic pressure generation mechanism 11.

Moreover, the dynamic pressure generation mechanism 11 is provided on the sliding surface S of the stationary-side sealing ring 5, but may be provided on the sliding surface S of the rotating-side sealing ring 3.

REFERENCE SIGNS LIST 1 mechanical seal
2 sleeve
3 rotating-side sealing ring
5 stationary-side sealing ring
6 coiled wave spring
7 bellows
8 packing
9 casing
10 rotating shaft
11 dynamic pressure generation mechanism
11a inlet opening
11b toe part
12 dynamic pressure generation mechanism
S sliding surface

The invention claimed is:

1. A pair of sliding members that slide relative to each other on sliding surfaces, characterized in that:
at least one of the sliding surfaces includes a dynamic pressure generation mechanism, and the curvature of the dynamic pressure generation mechanism increases according to the flow path length from an inlet opening of the dynamic pressure generation mechanism.

2. The sliding member according to claim 1, characterized in that the angle between a circumferential edge of the sliding surface and the inlet opening of the dynamic pressure generation mechanism is set to from 0° to 45°.

3. The sliding member according to claim 2, characterized in that the shape of the dynamic pressure generation mechanism is represented by the following formulas:

$$P = P_0 + h \int_0^S e^{j\phi} dS \quad \text{(Formula 1)}$$

$$\phi = \phi_0 + \phi_v S + \phi_u S^2 \quad \text{(Formula 2)}$$

$$S = \frac{s}{h} \ (0 < S < 1), \quad \text{(Formula 3)}$$

where P is a position vector of a point on the dynamic pressure generation mechanism, $P_0$ is a position vector of the inlet opening of the dynamic pressure generation mechanism, s is a flow path length from $P_0$ to P, h is an entire length of the flow path of the dynamic pressure generation mechanism, S is what s is normalized by h, φ is a tangential angle at P, $i=\sqrt{-1}$ is an imaginary unit, $\varphi_0$ is a tangential angle at $P_0$, $\varphi_v$ is an increment of the tangential angle to $\varphi_0$ in h in a circular arc of the length h having $\varphi_0$, and $\varphi_u$ is an increment of the tangential angle to $\varphi_v$ in h.

4. The sliding member according to claim 2, characterized in that the dynamic pressure generation mechanism is such that one end communicates with a leakage side and the other end is surrounded by a land portion.

5. The sliding member according to claim 2, characterized in that the dynamic pressure generation mechanism is such that one end is surrounded by a land portion and the other end communicates with a sealed fluid side.

6. The sliding member according to claim 2, characterized in that the dynamic pressure generation mechanism is surrounded by a land portion.

7. The sliding member according to claim 2, characterized in that the dynamic pressure generation mechanism is made of a groove portion.

8. The sliding member according to claim 2, characterized in that the dynamic pressure generation mechanism is a pseudo flow path made of a dimple group consisting of a plurality of dimples.

9. The sliding member according to claim 1, characterized in that the shape of the dynamic pressure generation mechanism is represented by the following formulas:

$$P = P_0 + h \int_0^S e^{j\phi} dS \quad \text{(Formula 1)}$$

$$\phi = \phi_0 + \phi_v S + \phi_u S^2 \quad \text{(Formula 2)}$$

$$S = \frac{s}{h} \ (0 < S < 1), \quad \text{(Formula 3)}$$

where P is a position vector of a point on the dynamic pressure generation mechanism, $P_0$ is a position vector of the inlet opening of the dynamic pressure generation mechanism, s is a flow path length from $P_0$ to P, h is an entire length of the flow path of the dynamic pressure generation mechanism, S is what s is normalized by h, φ is a tangential angle at P, $i=\sqrt{-1}$ is an imaginary unit, $\varphi_0$ is a tangential angle at $P_0$, $\varphi_v$ is an increment of the tangential angle to $\varphi_0$ in h in a circular arc of the length h having $\varphi_0$, and $\varphi_u$ is an increment of the tangential angle to $\varphi_v$ in h.

10. The sliding member according to claim 9, characterized in that the dynamic pressure generation mechanism is such that one end communicates with a leakage side and the other end is surrounded by a land portion.

11. The sliding member according to claim 9, characterized in that the dynamic pressure generation mechanism is such that one end is surrounded by a land portion and the other end communicates with a sealed fluid side.

12. The sliding member according to claim 9, characterized in that the dynamic pressure generation mechanism is surrounded by a land portion.

13. The sliding member according to claim 9, characterized in that the dynamic pressure generation mechanism is made of a groove portion.

14. The sliding member according to claim 9, characterized in that the dynamic pressure generation mechanism is a pseudo flow path made of a dimple group consisting of a plurality of dimples.

15. The sliding member according to claim 1, characterized in that the dynamic pressure generation mechanism is such that one end communicates with a leakage side and the other end is surrounded by a land portion.

16. The sliding member according to claim 15, characterized in that the dynamic pressure generation mechanism is made of a groove portion.

17. The sliding member according to claim 1, characterized in that the dynamic pressure generation mechanism is such that one end is surrounded by a land portion and the other end communicates with a sealed fluid side.

18. The sliding member according to claim 1, characterized in that the dynamic pressure generation mechanism is surrounded by a land portion.

19. The sliding member according to claim 1, characterized in that the dynamic pressure generation mechanism is made of a groove portion.

20. The sliding member according to claim 1, characterized in that the dynamic pressure generation mechanism is a pseudo flow path made of a dimple group consisting of a plurality of dimples.

\* \* \* \* \*